INVENTORS
PHILIP A. NIMS
JOHN J. CROWLEY
HOWARD I. NELSON

BY Walter + Whitfield
ATTORNEY

Nov. 12, 1968  H. I. NELSON ET AL  3,410,315
WEFT REPLENISHING LOOM

Filed Oct. 11, 1965  9 Sheets-Sheet 2

INVENTORS
PHILIP A. NIMS
JOHN J. CROWLEY
HOWARD I. NELSON
BY Walter H Wakefield
ATTORNEY Nov. 12, 1968  H. I. NELSON ET AL  3,410,315
WEFT REPLENISHING LOOM
Filed Oct. 11, 1965  9 Sheets-Sheet 3
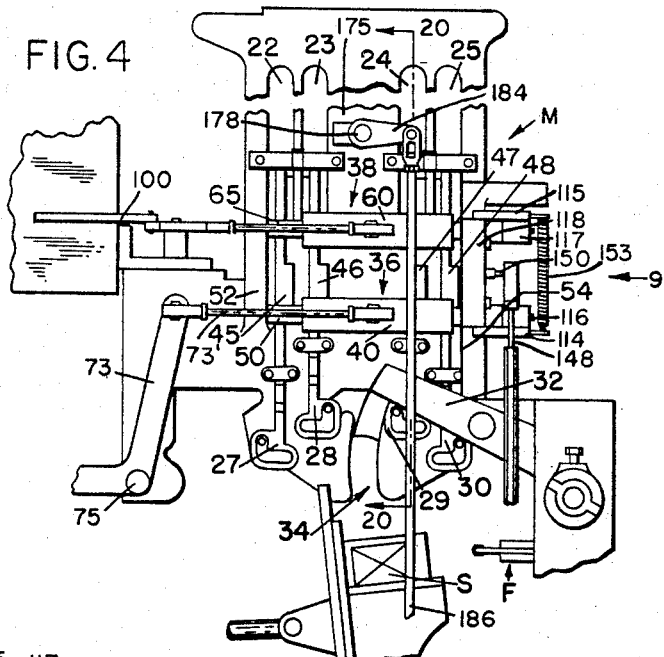
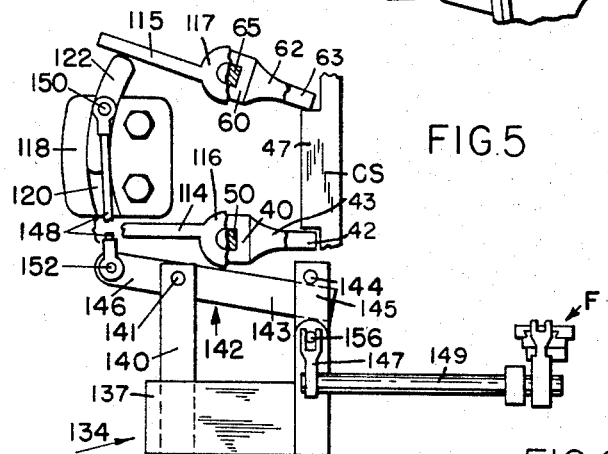
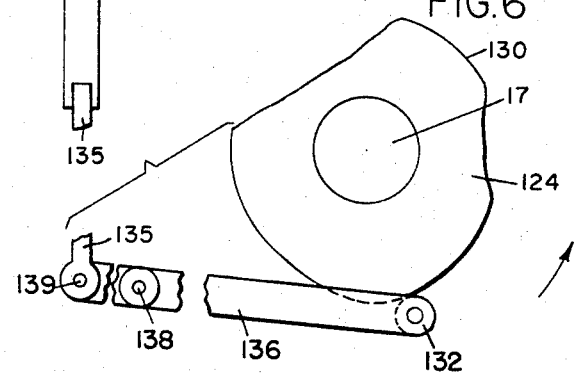
INVENTORS
PHILIP A. NIMS
JOHN J. CROWLEY
HOWARD I. NELSON
BY Walter H. Wchefield
ATTORNEY

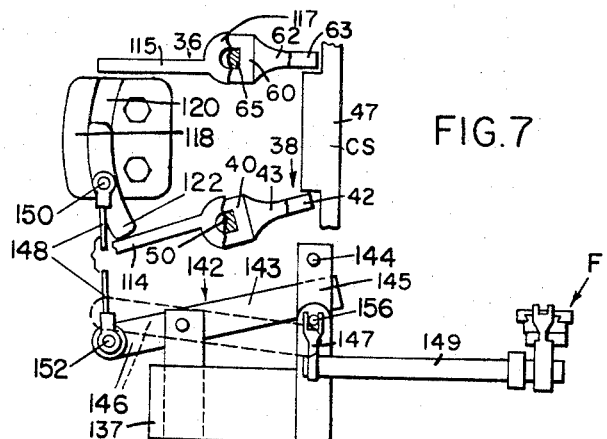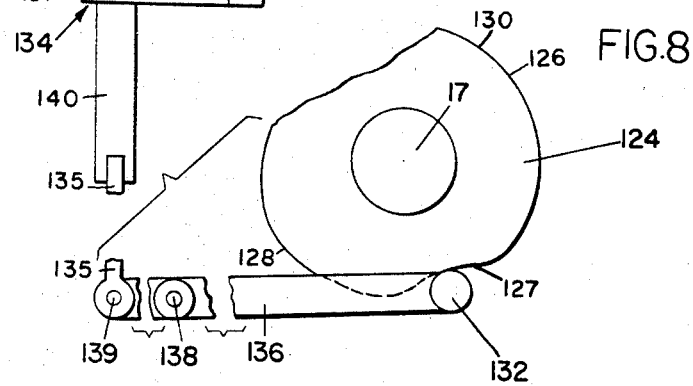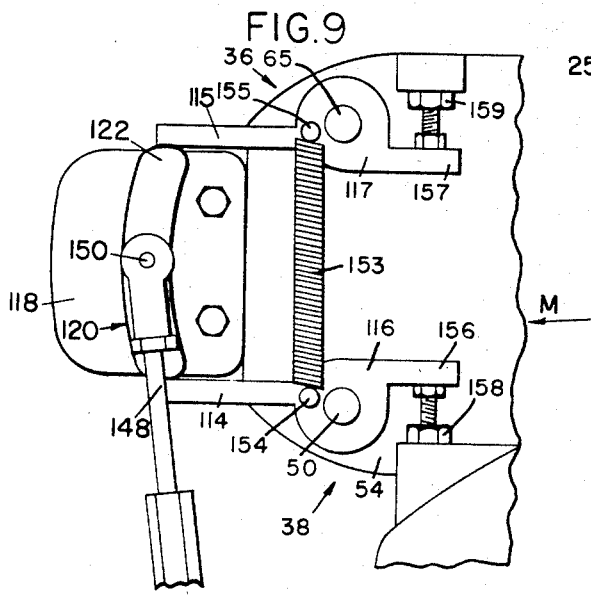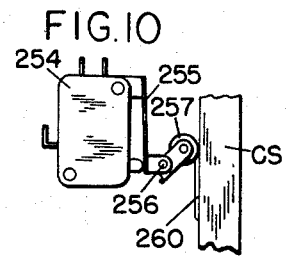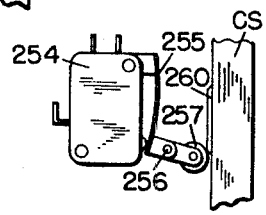
INVENTORS
PHILIP A. NIMS
JOHN J. CROWLEY
HOWARD I. NELSON
BY Walter H Wakefield
ATTORNEY

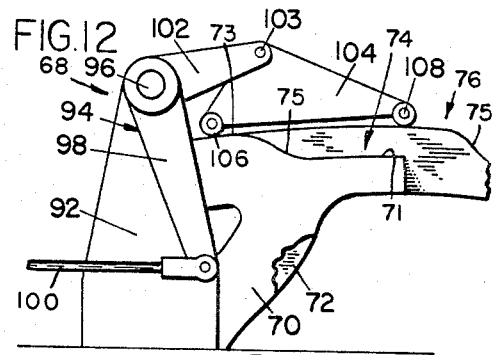
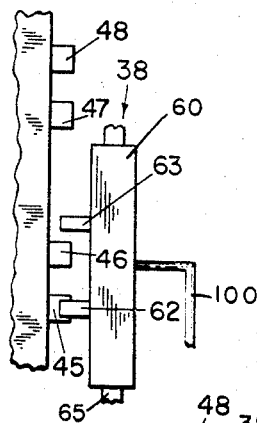
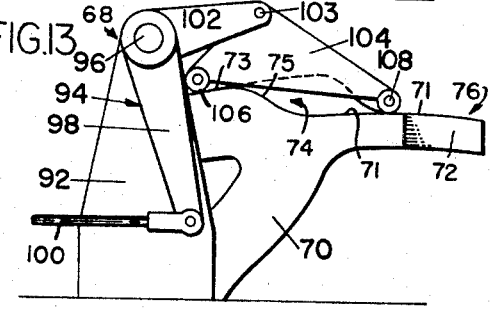
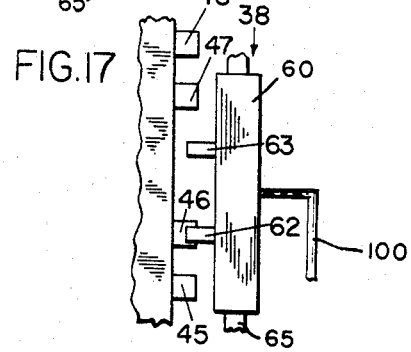
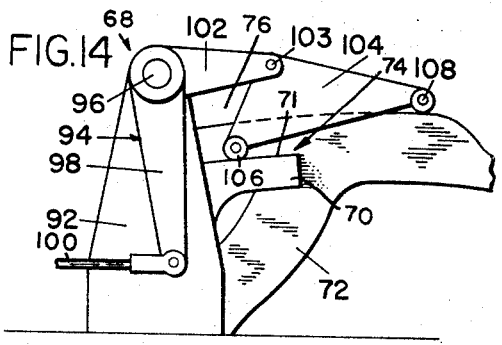
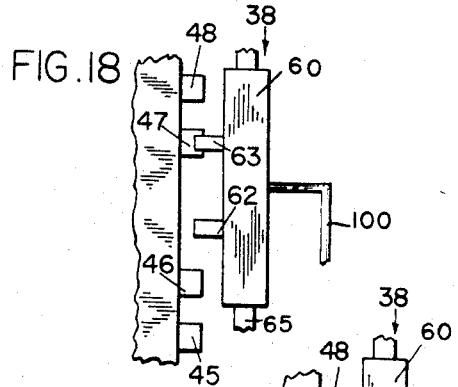
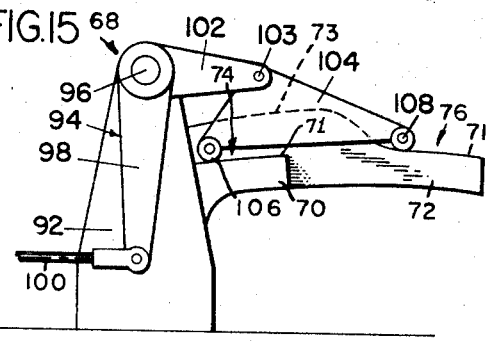
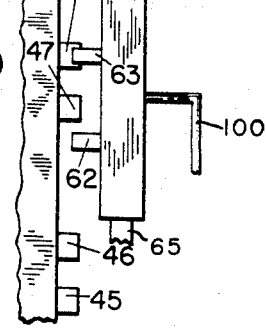
INVENTORS
PHILIP A. NIMS
JOHN J. CROWLEY
HOWARD I. NELSON
BY Walter K Wakefield
ATTORNEY Nov. 12, 1968     H. I. NELSON ET AL     3,410,315
WEFT REPLENISHING LOOM
Filed Oct. 11, 1965     9 Sheets-Sheet 6
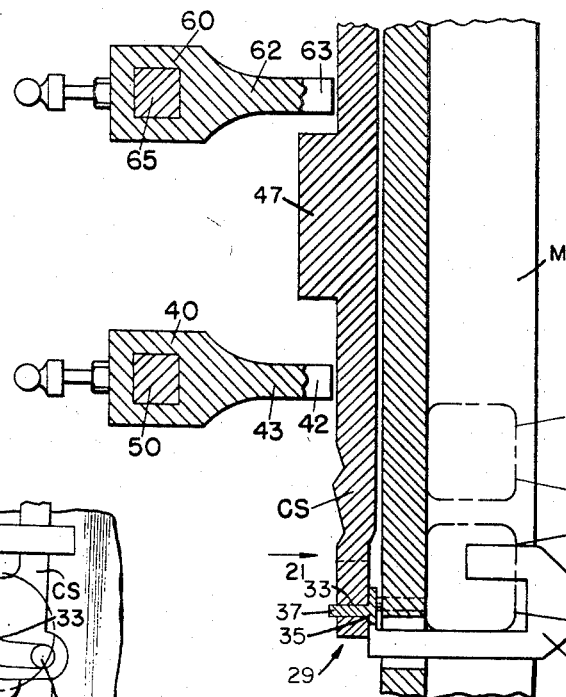
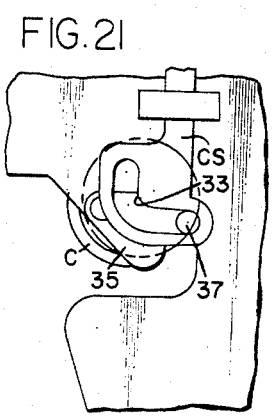
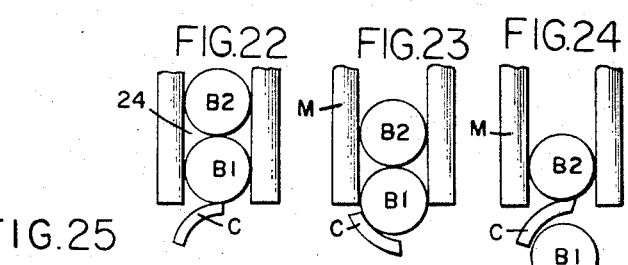
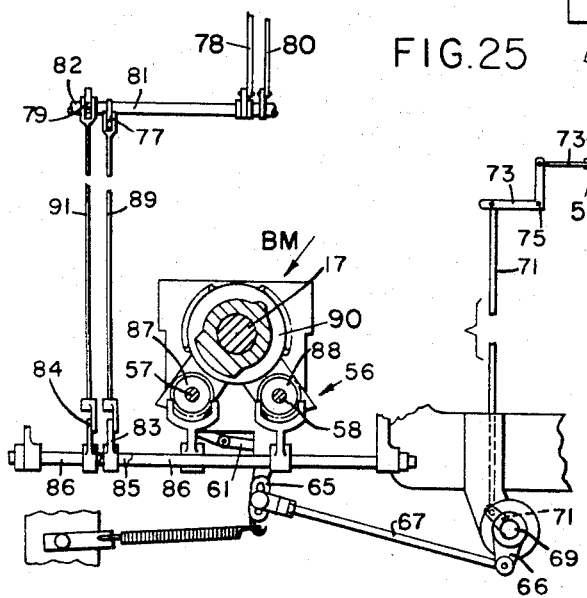
INVENTORS
PHILIP A. NIMS
JOHN J. CROWLEY
HOWARD I. NELSON
BY Walter␣␣␣␣␣
ATTORNEY

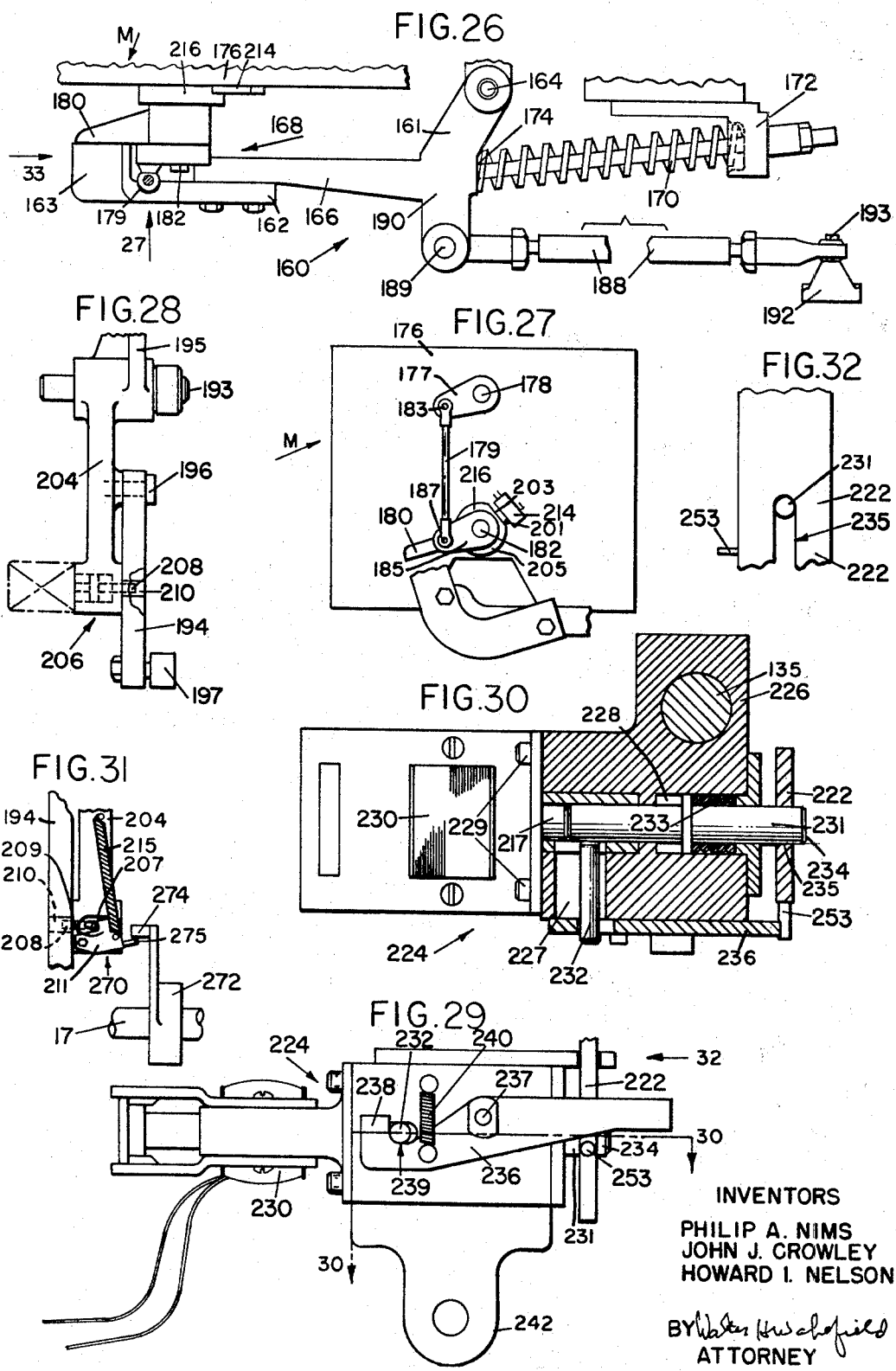

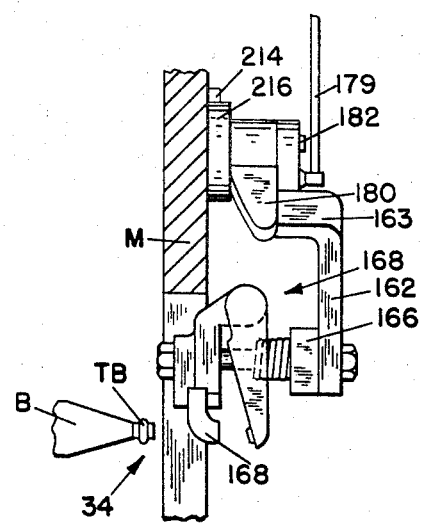

United States Patent Office

3,410,315
Patented Nov. 12, 1968

3,410,315
WEFT REPLENISHING LOOM
Howard I. Nelson, Grafton, John J. Crowley, Worcester, and Philip A. Nims, Auburn, Mass., assignors to Crompton & Knowles Corporation, Worcester, Mass., a corporation of Massachusetts
Filed Oct. 11, 1965, Ser. No. 494,393
14 Claims. (Cl. 139—232)

ABSTRACT OF THE DISCLOSURE

Bobbin releasing means for a multi-color magazine in which the release of a bobbin requires two steps. Two separate independently timed color selecting devices are used, the first device being effective to perform the first step preparatory to releasing a bobbin when a weft exhaustion feeler indicates weft exhaustion and the second device being effective to perform the second step to release a bobbin for which a first releasing step had been performed.

---

The present invention relates to looms of the multi-color automatic bobbin changing type operating with shifting shuttle boxes controlled from a pattern mechanism and relates particularly to an improved bobbin selecting and releasing means for a stationary magazine.

The type of loom described above usually employs a feeler mechanism located on the magazine side of the loom for sensing the near exhaustion of bobbins. The pattern mechanism which controls the shifting shuttle boxes is located on the side of the loom opposite the stationary magazine. The usual type of bobbin selecting and releasing means as shown for instance, in Patent Numbers 1,030,748 and 1,521,182 moves selectively on the magazine according to the motion of the shifting shuttle boxes through mechanism connected therewith. In this way the position of the selector on the magazine will be in the selecting position which corresponds to the shuttle which is undergoing a feeling operation at the magazine end of the loom. If the feeler indicates a need for bobbin replenishment, it causes the bobbin selector to give a first actuating motion to a bobbin support, preparatory to dropping a bobbin to transfer position. The shuttle is then picked across the loom to the pattern mechanism end and upon arrival there, the boxes can be shifted for selection of a new shuttle to be picked back to the magazine end. If the same shuttle is to return to the magazine end, the boxes will not shift and the selector mechanism will remain in the same position. If the same shuttle is to return, the bobbin support which had been given a first actuating motion will now be given a second actuating motion to release the bobbin so that it may drop to the transfer position to be transferred into the shuttle when it arrives at the magazine end.

Because of the drop from its normally stored position in the magazine to the transfer position, the bobbin is likely to bounce or otherwise not settle down for a moment or two after reaching transfer position. This condition is commonly referred to as "stumbling bobbins." This has not been too much of a problem with lower loom speeds where there is plenty of time for the bobbin to settle down and not interfere with the transfer operation. With increasing loom speeds a point is reached where there is little or no time for the bobbin to settle before transfer and the transfer hammer may not strike the bobbin evenly, resulting in a faulty transfer. Even at conventional loom speeds, if another intermediate operation is added such as removing a tip bunch on bobbins so provided, more time is needed to perform the operation.

It is an important object of the present invention to provide bobbin selecting and releasing mechanism which will give a selected bobbin holder a first actuating motion as in the usual manner and a second actuating motion to said bobbin holder at an earlier time in the loom cycle to release a bobbin sooner than was heretofore possible.

Another object of the invention is to provide control means for operating a weft tip bunch remover as applied to a multi-stack magazine where bobbin holders are given first and second actuating motions for bobbin release.

A further object of the invention is to provide control means for operating a bobbin transfer latch for transferring a bobbin which is released to a common transfer position more than one beat earlier than the transfer beat of the loom.

Other objects and the details of that which is believed to be novel will be clear from the following description and claims taken with the accompanying drawings in which is illustrated an example of a device embodying the present invention.

In the drawings:

FIGURE 4 is a side elevation of the multi-stack bobbin magazine looking in the direction of arrow 4, FIGURE 1;

FIGURE 5 is a diagrammatic view illustrating the actuating operation of the second color selector;

FIGURE 6 is a view of the cam and follower for operating the color selectors and is shown in the position for operating second color selector;

FIGURE 7 is a diagrammatic view illustrating the actuating operation of the first color selector;

FIGURE 8 is a view of the cam of FIGURE 6 and shown in the position for operating the first color selector;

FIGURE 9 is a fragmentary front elevation looking in the direction of arrow 9, FIGURE 4, showing a portion of the color selector actuator means;

FIGURES 10 and 11 are operational views of one of the switches on the magazine which operate a second solenoid means;

FIGURES 12 to 15 are diagrammatic views of the second color selector control means;

FIGURES 16 to 19 are diagrammatic views illustrating the different color selecting positions of the second color selector and correspond in timed relation to FIGURES 12 to 15 respectively;

FIGURE 20 is a vertical section on line 20—20, FIGURE 4;

FIGURE 21 is a fragmentary view looking in the direction of arrow 21, FIGURE 20;

FIGURES 22 to 24 are diagrammatic views illustrating the effect of two actuating motions for releasing a bobbin in a manner well known in the art;

FIGURE 25 is a diagrammatic view illustrating the first color selector control means;

FIGURE 26 is a plan view of a weft tip bunch remover operating mechanism as applied to a multi-weft magazine;

FIGURE 27 is a fragmentary view looking in the direction of arrow 27, FIGURE 26;

FIGURE 28 is a fragmentary view looking in the direction of arrow 28, FIGURE 2;

FIGURE 29 is an enlarged view of a first solenoid means shown in FIGURE 2;

FIGURE 30 is a horizontal section on line 30—30, FIGURE 29;

FIGURE 31 is a view of the opposite side of a portion of that which is shown in FIGURE 28;

FIGURE 32 is a view looking in the direction of arrow 32, FIGURE 29;

FIGURE 33 is a fragmentary view loking in the direction of arrow 33, FIGURE 26 and illustrating the bunch remover.

General description of the loom

Figure 1:
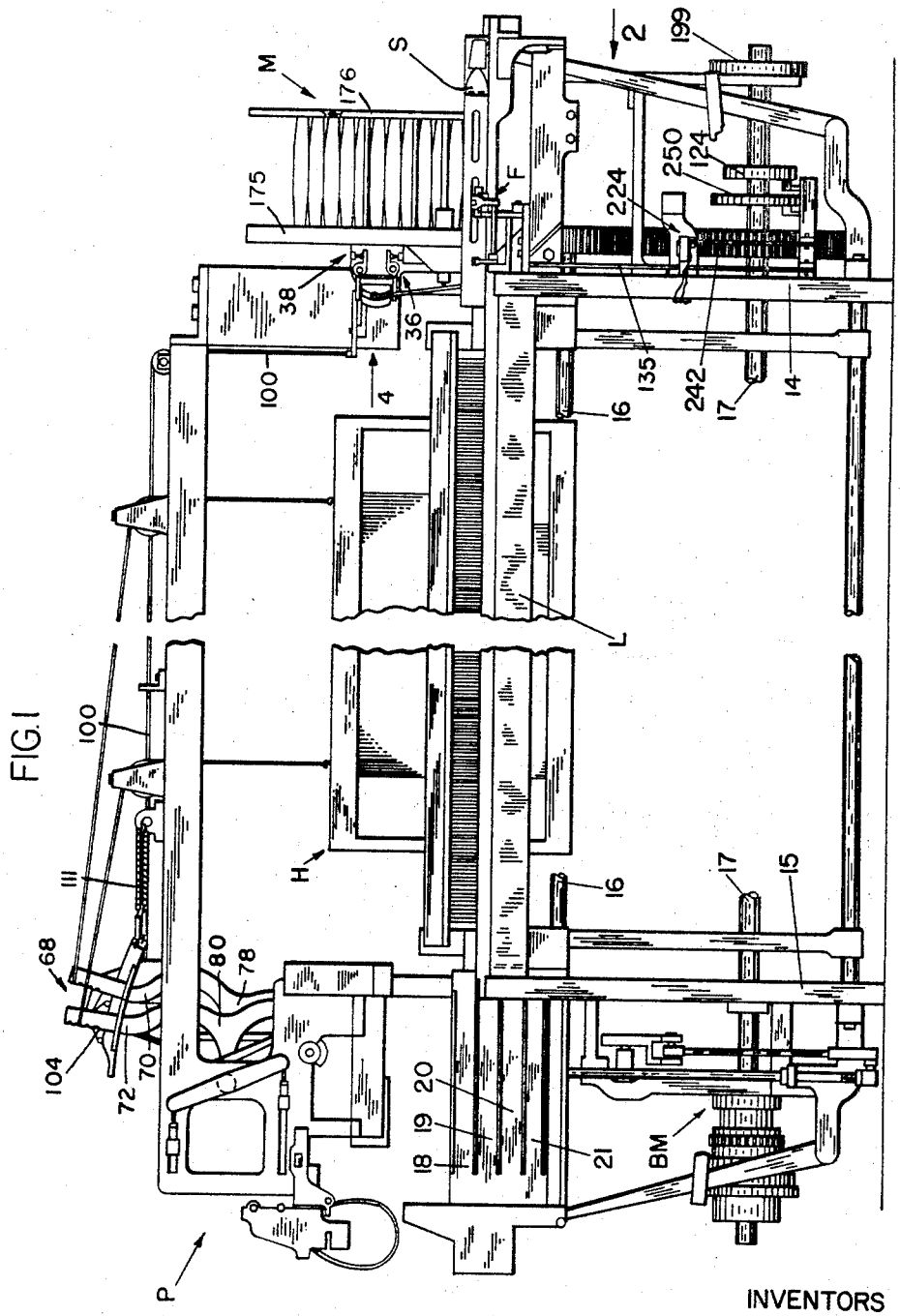
FIGURE 1 is a front elevation of the type of loom to which the invention relates with the invention applied thereto.

Referring to FIGURE 1 there is shown a multi-color automatic weft replenishing loom having right and left-hand loom sides 14 and 15, top and bottom shafts 16 and 17, respectively, and a lay L. Located at the left hand side of the loom as viewed in FIGURE 1 is a dobby pattern mechanism generally indicated at P. The dobby controls the harness frames H and the shifting shuttle boxes 18–21 through a shuttle box shifting mechanism generally indicated at BM. Located at the right hand side of the loom is a multi-stack magazine generally indicated at M which contains a supply of reserve bobbins corresponding to that in each shuttle contained in said shuttle boxes. A filling detector mechanism or feeler F is shown beneath the magazine for detecting a near weft exhaustion in the active shuttle.

General description of the magazine

Referring to FIGURES 4 and 20–24 there is shown the magazine M having four compartments 22–25 each containing a stack of bobbins. The stacks in compartments 22–25 are supported by bobbin supporting and releasing means 27–30 respectively. Located adjacent to the magazine is a transfer hammer 32 for transferring a bobbin released from one of said stacks to a common transfer position 34 into a shuttle S. One of these supporting and releasing means namely 29, is shown in more detail in FIGURES 20 and 21. Means 29 includes a color slide CS which is slidingly supported on appropriate guides on the magazine M. The lower end of the color slide has an enlarged portion 31 which contains an L shaped slot 33. A plate 35 is pivoted on the magazine and is rigidly attached to a bobbin support or cradle C. Plate 35 also has a pin 37 which extends into slot 33. Normally, the color slide is in a down position with pin 37 in the upper vertical portion of slot 33. When the slide CS is in this position, plate 35 is swung clockwise from its position in FIGURE 21 so that the cradle it supports in in the position shown in FIGURE 22. When the color slide is moved up, pin 37 moves in the lower vertical portion of slot 33 and plate 35 is swung counterclockwise to the position shown in FIGURE 21. This causes the cradle which is supported by plate 35 to rock to the position shown in FIGURE 23, thus enabling a bobbin from that particular stack to fall into it. A subsequent downward motion of the color slide will return the cradle to its original position and release a bobbin as shown in FIGURE 24.

The mechanism and operation just described are well known in the art. Prior art devices made use of a single color selector to move the color slides to their upper and lower positions. The present invention makes use of two color selectors to move the color slide and operate the bobbin supporting and releasing mechanism. One color selector moves the color slide to the "up" position and the other color selector moves the color slide to the "down" position. The color slides and the cradles C which they control are operated in the usual manner except that the down motion of the color slide which is effective to release a bobbin, occurs at an earlier time in the loom cycle. The reasons why two color selectors can release a bobbin earlier than one color selector will be evident after reading the following sections in which there is a general description of the color selectors followed by descriptions of their independent color selecting or indexing motions. The mechanisms for controlling the color selecting motion of the color selectors will be described as well. Mechanism for actuating the color selectors to lift and lower the color slides will be described in a following section. Since the present invention enables a bobbin to be dropped to a transfer position at such an early time, conventional mechanism for transfer latch lifting cannot be used; mechanism for accomplishing this will be described in a separate section. The last two sections deal with mechanism for operating a tip bunch remover and a description of the general timing of all operations.

Color selectors

Referring to FIGURES 4–9 and 20 there is located on the magazine M a first color selector 36 and a second color selector 38. The first color selector 36 is a sleeve-like member 40 having a pair of rigid projecting fingers 42 and 43 extending toward the magazine in selective register with projections 45–48 on previously mentioned supporting and releasing means 27–30 respectively. Sleeve 40 has a square cross section which enables it to be supported and to slide longitudinally on a shaft 50 which also has a square cross section. The ends of shaft 50 are cylindrical and are rotatably mounted in bearings 52 and 54 on the magazine. Sleeve 40 is rotatable with shaft 50 because of their respective cross sections.

The second color selector 38 is located on the magazine above the first color selector. It is also a sleeve-like member designated by the reference character 60 and having a pair of rigid projecting fingers 62 and 63 extending toward the magazine. Fingers 62 and 63 are in selective register with projections 45–48 on supporting and releasing means 27–30 respectively. Sleeve 60 has a square cross section which enables it to be slidingly supported on a shaft 65 which also has a square cross section except for its ends by which it is rotatably mounted in bearings 52 and 54. Sleeve 60 is rotatable with shaft 65 because of their respective cross sections.

Indexing of first color selector

Referring to FIGURES 1, 4 and 25 there is shown mechanism for controlling the indexing of the first color selector. As seen in FIGURE 1, the pattern mechanism P is a double index dobby that is, one which indicates for two picks for each reading of a pattern card. The pattern mechanism P operates harness jacks for operating the harnesses. Two of the jacks, indicated at 70 and 72, are used to control the shuttle box shifting mechanism or box motion BM. The box motion in turn controls the indexing of the first color selector as will be described.

For controlling the box motion, jacks 70 and 72 have lower portions 78 and 80 respectively, which are connected to shafts 81 and 82 respectively, see FIGURE 25, as jacks 70 and 72 are moved by the pattern mechanism, shafts 81 and 82 make a partial rotation. Rotation of shafts 81 and 82 operate levers 77 and 79 respectively which in turn operate levers 83 and 84 respectively through connecting rods 89 and 91 respectively. Operation of levers 83 and 84 cause shafts 85 and 86 respectively to be partially rotated and in so doing, to operate levers 93 and 95 to operate a bull tooth (not shown but well known in the art, see FIGURES 1 and 2 of previously mentioned U.S. Patent 3,128,796) in gears 87 and 88 respectively. When a bull tooth is so operated, its respective pinion gear will become engaged with a constantly rotating main gear 90. Gears 87 and 88 are selectively engaged with main gear 90 and in turn operate box shifting elements as shown in the above-mentioned U.S. patent. Main gear 90 rotates with bottom shaft 17 which is a two pick shaft so that there is considerable space between pinion gear engaging sections on the main gear to allow for early operation of the bull tooth. The indications from the pattern mechanism, therefore, occur considerably before the time for shifting of the shuttle boxes. The box shifting sequence will occur when the shuttle is at the box or pattern end of the loom. This is very important to remember when considering the operation of the second color selector to be described.

Figure 3:
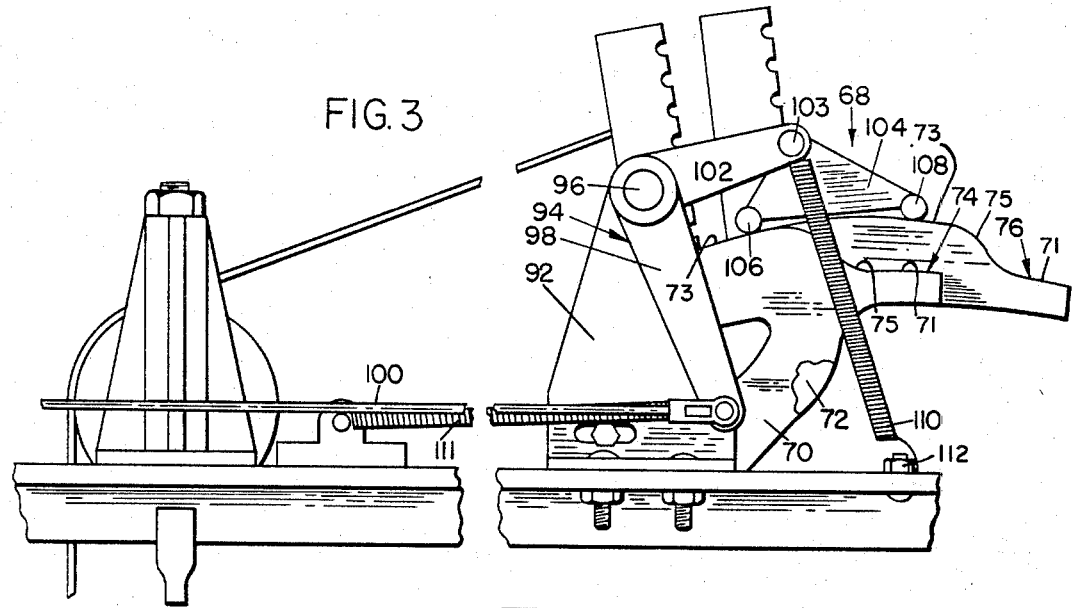
FIGURE 3 is a fragmentary rear elevation of the second color selector control means.

While the rotation of gears 87 and 88 are rotated by main gear 90 to shift the shuttle boxes, they also serve to index the first color selector. The supporting shafts 57 and 58 of gears 87 and 88 respectively extend parallel to shaft 17 and have cams mounted thereon (see FIGURE 3 of U.S. Patent 3,128,796). These cams engage a cam lever 61 to effect rocking of a lever 65 which rocks a lever 66 through a connecting link 67. Lever 66 is fixed to a shaft 69 which extends to the opposite side or magazine end of the loom. Attached to the other end of shaft 69 is another lever 71. The rocking of lever 66 partially rotates shaft 69 which causes lever 71 to rock. A lever 73 is pivotally attached to the magazine at 75 and is connected to lever 71 through a connecting rod 71'. Lever 73 is connected to sleeve 40 of the first color selector 36 by a connecting rod 73'. When lever 71 is rocked, it effects rocking of lever 73 which in turn causes sleeve 40 to slide on shaft 50.

The indexing operation just described will place one of the fingers 42 and 43 in register with one of the projections 45–48 of the color slide which corresponds to the particular shuttle brought into active position by the box motion BM. The indexing operation of the first color selector 36 is the same as for the single color selector used in prior art devices with respect to both operating mechanism and timing (see previously mentioned U.S. Patents 1,030,948 and 3,128,796 for example).

*Indexing of second color selector*

Referring to FIGURES 1, 3, 4 and 12–19, there is shown mechanism for indexing the second color selector 38. The indexing is controlled from the pattern mechanism P through a second color selector control means generally indicated at 68, see FIGURE 1.

Referring particularly to FIGURES 3 and 12–19, the second color selector control means includes the two previously mentioned "jack" levers 70 and 72. The "jack" levers have their upper ends modified to include cam surfaces 74 and 76 for levers 70 and 72 respectively.

Control means 68 also includes a stand 92 located on a fixed portion of the loom and which acts as a support means for a bell-crank lever 94 pivoted at 96. One arm, 98, of lever 94 is operatively connected to the second color selector through a connecting rod 100. The other arm, 102, of lever 94 is pivotally attached to a rigid, triangular shaped cam follower means 104 by a pivot 103. Spaced from each other and from pivot 103 on cam follower means 104, are two cam follower rolls 106 and 108 which are in following engagement with cam surfaces 74 and 76 respectively. A spring 110 anchored at 112 on a fixed portion of the loom is connected to arm 102 to keep rolls 106 and 108 against their respective cam surfaces. A spring 111 attached to arm 98 may be used if desired. Surfaces 74 and 76 each have a low portion 71 and a high portion 73 separated by an incline 75. Each of the "jack" levers 70 and 72 can be moved to one of two positions, to the right and to the left as shown in FIGURES 12–15. Levers 70 and 72 therefore can be manipulated to produce four different conditions: (1) both levers to the right; (2) both levers to the left; (3) lever 72 to the right and lever 70 to the left; (4) lever 70 to the right and lever 72 to the left.

Cam surfaces 74 and 76 operate bell-crank lever 94 through follower member 104. Second color selector 38 is operatively connected to bell-crank lever 94 so that the motion of lever 94 moves sleeve 60 to one of four different positions as shown in FIGURES 16–19. Lever 94 is moved to four different positions in the following manner: When levers 70 and 72 are both to the right as shown in FIGURE 13, follower rolls 106 and 108 engage upper cam surfaces 73 to bring lever arm 98 of lever 94 to the extreme right hand position as seen in FIGURE 12. When arm 98 is in this position, projection 62 is in register with projection 45 of bobbin supporting means 27 as shown in FIGURE 16. In FIGURE 13, lever 70 is in the right hand position and lever 72 is in the left hand position. Rolls 106 and 108 therefore contact surfaces 73 and 71 of levers 70 and 72 respectively. When follower means 104 is moved into the position shown in FIGURE 13, arm 98 of lever 94 assumes an intermediate right hand position. When arm 98 is moved to this position, sleeve 60 is moved so that projection 62 registers with projection 46 of bobbin supporting means 28 (see FIGURE 17). When lever 70 moves to the left and lever 72 moves to the right as seen in FIGURE 14, rolls 106 and 108 contact cam surfaces 71 and 73 respectively of levers 70 and 72 respectively. This causes arm 98 to asume an intermediate left hand position and to effectively move sleeve 60 so that projection 63 registers with projection 47 of bobbin supporting means 29 (see FIGURE 18). Followers 106 and 108 contact lower cam surfaces 71 of jack levers 70 and 72 respectively when both jack levers are moved to their left hand positions as shown in FIGURE 15. This causes cam follower means 104 to rock bell crank lever 94 counter-clockwise to bring arm 98 to its extreme left hand position. When arm 98 is moved to this position, sleeve 60 is moved accordingly so that projection 63 registers with projection 48 of bobbin support means 20 (see FIGURE 19).

Since levers 70 and 72 control box motion, BM, as previously mentioned, as well as the second control means, second color selector 38 will be operated so that it will be in a color selecting position corresponding to the indication being transmitted to the box motion. This indication occurs earlier than the box shift itself, as previously described, so that second color selector 38 is in position before every box shift while the first color selector 36 moves into position concurrently with the shifting of the shuttle boxes. This difference in timing between the first and second color selectors is essential for purposes to be described.

*Actuating mechanism for color selectors*

Referring to FIGURES 4–9, there is shown a common actuating means to operate the first and second color selectors for releasing bobbins to the common transfer position 34. The actuating means includes a first supporting element for the first color selector which in this case is the previously described shaft 50 and a second supporting element for the second color selector which is previously mentioned shaft 65. First and second actuating arms 114 and 115 extend from collars 116 and 117 respectively which are fixed to the cylindrical outer portions of shafts 50 and 65 respectively. A supporting guide means 118 is located between the first and second actuating arms 114 and 115, and has a vertically extending arcuate slot 120. An actuator member 122 is slidable in slot 120. A rod 148 is pivotally attached to member 122 at 150. An actuator cam 124 (see FIGURES 6 and 8), has a cam surface 126 with a low portion 127, a high portion 128 and a neutral portion 130. An actuator cam follower 132 engages surface 126 and is attached to one end of a lever 136 which is pivoted at 138.

A rod 135 is pivotally attached at 139 to the other end of lever 136. The motion of follower 132 for moving member 122 is transmitted from rod 135 to rod 148 through actuator operating means generally indicated at 134.

Actuator operating means 134 includes the usual feeler controlled "chopper lever" mechanism as shown for instance in U.S. Patents 1,030,748 and 3,101,099. The "chopper lever," indicated generally at 142, is pivoted at 141 to a vertical rod 140 which is slidable in a stand 137 and attached at its lower end to rod 135. One end, 146, of lever 142 is pivotally attached at 150 to connecting rod 148. The other end, 143, of lever 142 extends through a slot (not shown) in an upwardly extending portion 145 of stand 137. Pins 144 and 156 extend through portion 145 and extend above and below respectively of end 143 of lever 142. Pin 144 is fixed in portion 145 but pin 156 is capable of being pulled out by a lever 147 which is fixed to one end of a shaft 149. The feeler F is operatively attached to the other end of shaft 149. When the feeler F indicates sufficient weft in the active shuttle, it is effective to rock shaft 149 thereby causing lever 147 to pull pin 156 out from under end 143 of lever 142. When the feeler indicates a weft exhaustion, it will not rock shaft 149 and pin 156 will not be pulled out. The control of pin 156 will influence the operation of actuator operating means in a manner described hereinbelow.

Cam 124 is fixed to bottom shaft 17 and therefore will make one revolution for every two picks. When cam 124 reaches the position shown in FIGURE 5, follower 132 will be riding on the high portion 128 of surface 126 and will cause lever 136 to rock around pivot 138. The motion will lift rods 135 and 140. Upward motion of rod 140 will cause lever 142 to fulcrum clockwise on pin 144. End 146 of lever 142 will therefore be swung upwardly and in turn will be effective to raise actuator member 122 in slot 120. When member 122 is moved upwardly as shown in FIGURE 5, it strikes second actuating arm 115 thus swinging second color selector 38 clockwise as shown in FIGURE 6. When color selector 38 is actuated in this manner, fingers 62 and 63 will be swung downwardly.

The operation just described occurs regularly, once for every two picks. For the most part, it will be a "false motion" that is, it will accomplish nothing most of the time. It will function as a second actuating motion only when the particular color slide with which it is in register has already been given a first actuation motion and is in the "up" position as shown in FIGURE 7.

The first actuating motion occurs when follower 132 is riding on the low portion 127 of cam 124, causing rods 135 and 140 to be pulled downwardly as shown in FIGURE 7. This motion also occurs every other pick and co-incidentally with a bobbin sensing operation which will determine whether pin 156 will be pulled out or not. If the feeler indicates ample weft, pin 156 will be pulled out and the downward motion of rod 140 will swing lever 142 clockwise around pivot 152 to the dotted line position as shown in FIGURE 7. This is also a false motion and will not affect actuator member 122 at all. If the feeler does indicate a weft exhaustion, pin 156 will not be pulled out and the downward motion of rod 140 will fulcrum lever 142 on pin 156 in a counter-clockwise direction as shown in full lines in FIGURE 7. When lever 142 is moved in this manner, it will cause rod 148 to pull member 122 downward in slot 120. When member 122 swings downward, it will strike first actuating arm 114 and rock first color selector counter-clockwise as shown in FIGURE 7. When this occurs, one of the rigid fingers 42 or 43 will give a first actuating motion to the color slide which corresponds to the shuttle which is undergoing a feeling operation. This will rock the cradle to which the color slide is attached in a preparatory motion for bobbin release as described earlier and shown in FIGURE 23.

Referring to FIGURE 9, member 122 is shown in neutral position which occurs when follower 132 contacts portion 130 of cam 124. A spring 153 attached to pins 154 and 155 which extend from collars 116 and 117 respectively. Spring 153 tends to urge arms 114 and 115 towards each other but this urging is limited by stop arms 156 and 157 which extend from collars 116 and 117 respectively. Stop arms 156 and 157 abut adjustable stops 158 and 159 respectively.

Very soon after the bobbin support is given a first actuating motion, follower 132 is contacted by the high portion 128 of the cam groove causing fingers 62 and 63 of the second color selector to swing downwardly as previously described. Since the second color selector operates earlier than the first color selector, as previously described, it will be in the position corresponding to the shuttle which will be activated as a result of the next box shifting operation and not necessarily to the active shuttle which precipitated the actuation of the first color selector. If the pattern governing the shuttle sequence is such that the same shuttle will be returning to the "magazine end" immediately after reaching the "head end," the second color selector will be in position so that one of its fingers will be aligned with the projection of the color slide which had just been lifted. The downward motion of one of the fingers 62 and 63 will then cause the color slide to be knocked downwardly, thereby rocking the cradle back to its original position and dropping the bobbin contained therein, as shown in FIGURE 24, to the common transfer position 34. If, after a bobbin support has been given a first actuating motion, the same shuttle does not return on the following pick to the magazine end, the second color selector will move to other positions until two picks before such time that the shuttle is to return, where it will then be in position to give a second actuating motion to the bobbin support which had been given a first actuating motion earlier. This will provide plenty of time for the dropped bobbin to settle down in the transfer position and for removal of a tip bunch therefrom.

The reason that a bobbin can be dropped from its supporting cradle earlier in the present instance is that the second color selector is not restricted to the motion of the shifting shuttle boxes. Prior art devices which made use of a single color selector had to have it in the color selecting position which correspond to the particular shuttle undergoing a sensing operation by the feeler. This was necessary for the first actuating motion which indicated a weft exhaustion. The second actuating motion, which could only occur when the same shuttle was to return, had to wait until the color selector was in the proper color selecting position. This did not happen until the shuttle boxes began to shift. By using two color selectors, the first can be operated in the usual manner as for a single color selector, that is commensurate with the box motion; the second color selector can move to color selecting position well in advance of the shifting shuttle boxes. Since the second color selector is operated from the pattern mechanism which controls the box motion, it can use the early indication to the box motion. The second color selector then "knows" whether or not a particular shuttle is coming back while that shuttle is undergoing a sensing operation for weft depletion. If the same shuttle is not returning on the next pick, the second color selector will "know" when it is to return while the feeler is sensing another shuttle. In any event, the second actuating motion will occur nearly two picks before an actual bobbin transfer operation.

*Setting of transfer latch*

With prior art devices, the setting of the transfer latch could be tied in directly with the second actuating motion. This was possible because the second actuating motion occurred after the front center position which was prior to the front center position of transfer. In the present instance, the second actuating motion would set the transfer latch too early so that the bobbin would be expelled by the transfer hammer while the shuttle was on the opposite side of the loom. The present invention continues to use the second actuating motion to initiate the setting of manner. A conventional latch lifter and revoker mechanism to insure that the latch is set at the proper time.

Figure 2:
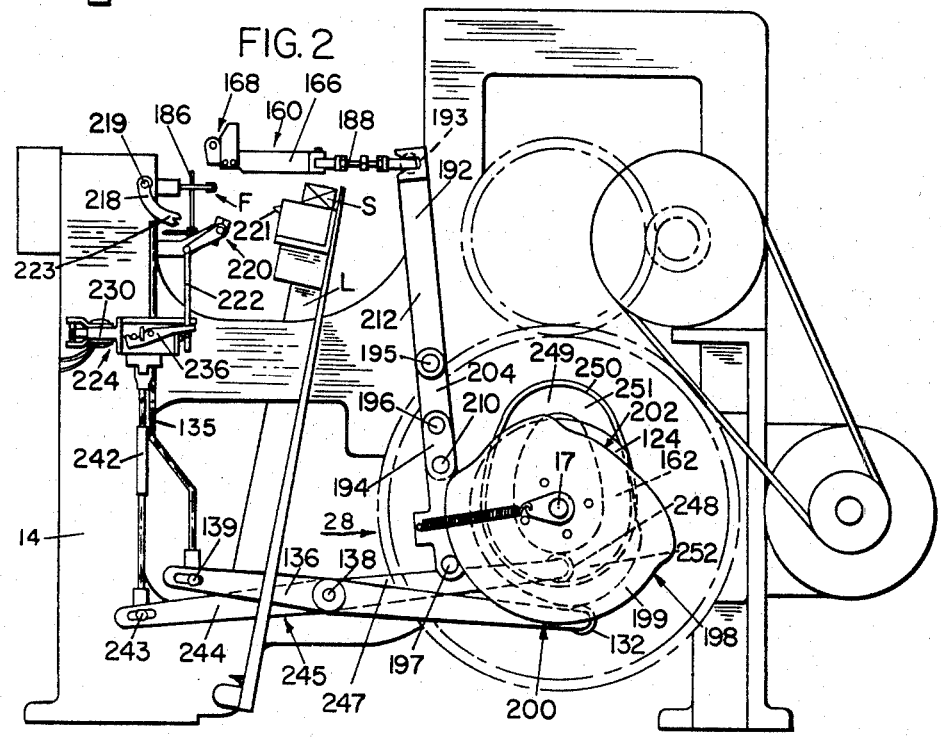
FIGURE 2 is a side elevation of the loom looking in the direction of arrow 2, FIGURE 1.
Figure 34:
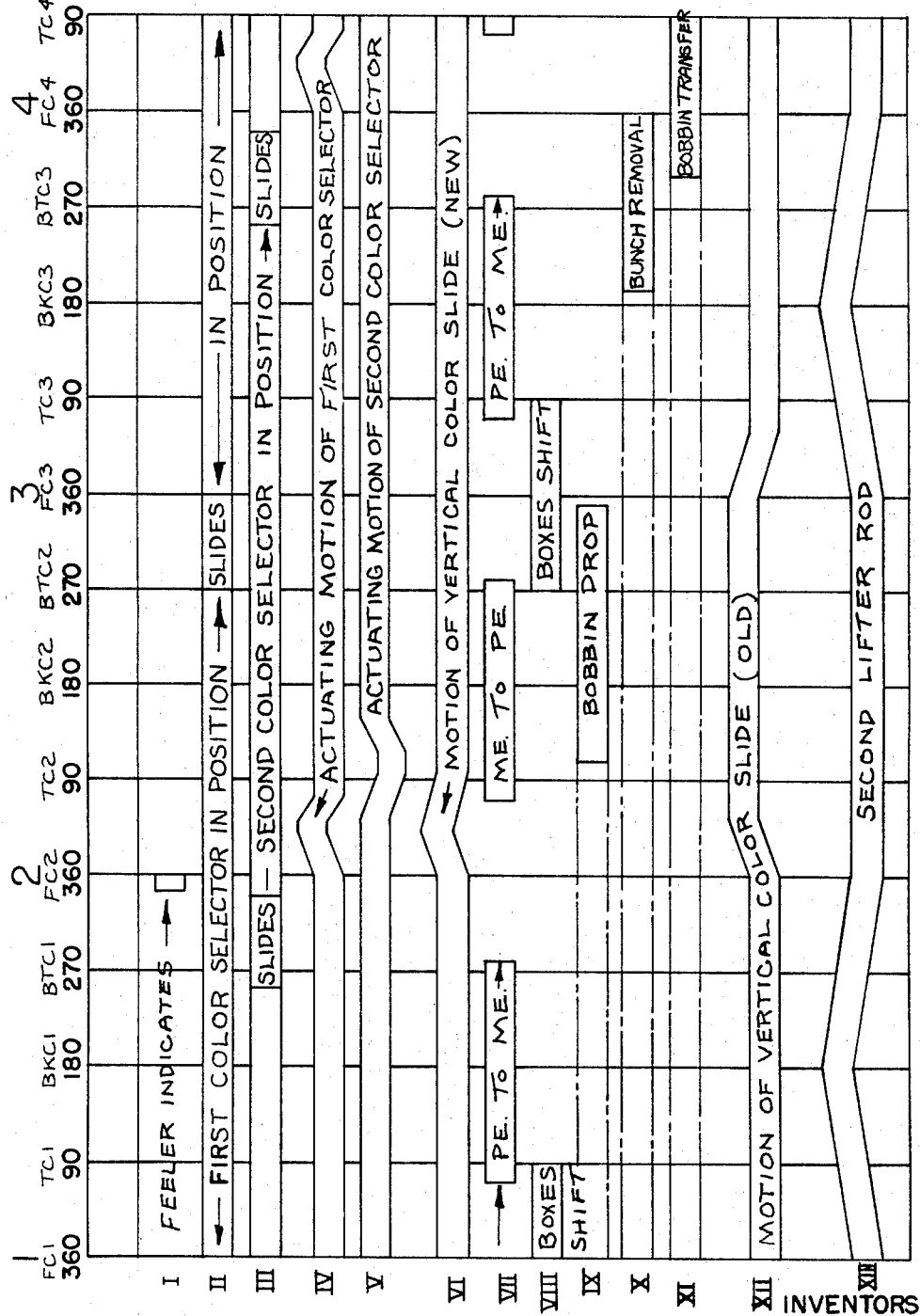
FIGURE 34 is a timing diagram.

The mechanism for setting the transfer latch is shown in FIGURES 2, 10, 11, 29, 30 and 32. Referring to FIGURE 2, there is shown the usual transfer latch 218 pivoted at 219 near side 14. When latch 218 is lifted to a substantially horizontal position, its V-shaped end 223 engages a bunter 221 fixed to the front of the lay L. When thus engaged, the latch 218 will cause the transfer hammer to transfer a bobbin from the common transfer

What is claimed and desired to be secured by Letters Patent of the United States is:

1. In a weft replenishing loom having a pattern mechanism and a plurality of shuttles, shifting shuttle boxes and bobbin stacks, bobbin selecting and releasing means comprising:
   (a) a pivoted cradle for each of the stacks, having a partial bobbin releasing position and a full bobbin releasing position;
   (b) cradle pivoting means adjacent each cradle, and adapted to pivot said cradle between partial and full releasing positions;
   (c) means for detecting weft need in an active shuttle;
   (d) a first color selecting means positioned in accordance with the active shuttle box, disposed adjacent said cradle pivoting means and adapted to cause said means to pivot the cradle of a bobbin stack which corresponds to said active shuttle to partial releasing position upon a need being detected by said weft detecting means;
   (e) a second color selecting means, positioned by the pattern mechanism so as to indicate the position of the shuttle boxes about one pick earlier than the shifting of the shuttle boxes to that position, said second color selecting means being disposed adjacent said cradle pivoting means and adapted to cause said means to pivot a cradle to full releasing position only if said cradle has been previously pivoted to partial releasing position, whereby said bobbin will be released to the transfer position more than one complete pick before transfer; and
   (f) actuating means for said cradle pivoting means adapted to pivot cradles selected by said first and second color selecting means.

2. In a loom as set forth in claim 1 wherein each of said cradle pivoting means has a projecting finger and said first and second color selecting means each have one or more projecting fingers for selective register with projecting fingers on said cradle pivoting means.

3. In a loom as set forth in claim 1 wherein said second color selecting means comprises:
   (a) a first jack lever controlled by said pattern mechanism and movable to one or the other of two positions;
   (b) a second jack lever controlled by said pattern mechanism independently of said first jack lever and movable to one or the other of two positions;
   (c) a first cam on said first jack lever;
   (d) a second cam on said second jack lever;
   (e) support means mounted on the loom adjacent said first and second jack levers;
   (f) a bell crank lever pivoted on said support means and having one of its arms operatively attached to said second color selector; and
   (g) a cam follower pivotally attached to the other arm of said bell crank lever, whereby said cam follower cooperates with said first and second cams so as to move said bell crank lever to one of four different positions depending upon the positions of said first and second jack levers.

4. In a loom as set forth in claim 1 wherein said actuating means comprises:
   (a) a first supporting element rotatably mounted on said magazine for slidingly supporting said first color selecting means along its longitudinal axis and being fixed to said first color selecting means against relative rotational movement therewith;
   (b) a second supporting element rotatably mounted on said magazine for slidingly supporting said second color selecting means along its longitudinal axis and being fixed to said second color selector against relative rotation therewith;
   (c) a first actuating arm fixed to said first supporting element and adapted to operate said cradle pivoting means for a partial releasing motion of said cradles;
   (d) a second actuating arm fixed to said second actuating element and adapted to operate said cradle pivoting means for a full releasing motion of said cradles;
   (e) a supporting guide means located adjacent said first and second actuating arms;
   (f) an actuator member guidingly supported by said support means, so as to be capable of being moved in a path which intersects said first and second actuating arms;
   (g) an actuator cam mounted on a continually turning shaft of the loom;
   (h) an actuator cam follower mounted for engagement with said cam; and
   (i) actuator operating means connected to said cam follower and said actuator member and under control of said feeler to transmit motion from said actuator cam and actuator cam follower to said actuator member whereby the motion of said actuator member will operate one of said first and second actuating arms to operate said cradle pivoting means.

5. In a loom having a plurality of shuttles, a reserve bobbin magazine provided with a stack of reserve bobbins for each shuttle, and a reciprocating lay which swings between front and back center positions, bobbin transfer mechanism comprising:
   (a) means to indicate weft exhaustion in said shuttles;
   (b) means to release a bobbin from a stack to a common transfer position in two steps, the first step being initiated upon indication of weft exhaustion in one of said shuttles and the second step occuring at least one pick before transfer of the bobbin into said one shuttle;
   (c) a transfer hammer for transferring a bobbin from said transfer position into a shuttle;
   (d) a bobbin transfer latch operatively connected to said transfer hammer and adapted to be moved to a position to be struck by said lay at the front center position to operate said transfer hammer; and
   (e) latch moving means responsive to the bobbin releasing means for moving said transfer latch into the path of said lay not more than one pick before the released bobbin is transferred into said shuttle.

6. In a loom as set forth in claim 5 wherein said latch moving means comprises:
   (a) a first normally stationary latch mover means which is adapted to be lifted and, when lifted, to place said transfer latch into position to be struck by said lay;
   (b) a second latch mover means which is continuously and vertically reciprocated by said loom so that its upward motion occurs not more than one pick before a bobbin transfer;
   (c) connecting means operated by said bobbin releasing means for operatively connecting said first latch mover means to said second latch mover means upon release of a bobbin by said bobbin releasing means, whereby the upward motion of said second latch mover means causes said first latch mover means to place said transfer latch into position to be struck by said lay.

7. In a loom as set forth in claim 6 wherein said bobbin transfer mechanism further comprises means to disconnect said first latch mover means from said second latch mover means upon transfer of said bobbin.

8. In a loom as set forth in claim 6 wherein said connecting means comprises:
   (a) a normally de-energized solenoid attached to one of said latch mover means and having a plunger which is effective when said solenoid is energized to connect said first and second latch mover means for upward motion;

(b) a normally open switch on said magazine adapted to be closed by said bobbin releasing means when a bobbin is released to said transfer position, thereby energizing said solenoid.

9. In a loom as set forth in claim 8 wherein said connecting means further comprises:
(a) locking means on said solenoid means for maintaining the plunger of said solenoid means in connecting relationship with said first and second latch mover means upon energization of said solenoid means;
(b) lock releasing means for releasing said locked plunger from first and second latch mover means connection, upon the subsequent downward motion of said second latch mover means.

10. In a weft replenishing loom as set forth in claim 5 comprising:
(a) a weft tip bunch remover mounted adjacent said magazine normally in non-tip bunch engaging position;
(b) engaging means adapted to move said bunch remover to tip bunch engaging position upon the release of a bobbin to said common transfer position; and
(c) disengaging means adapted to move said bunch remover away from said tip bunch engaging position after said remover has engaged said tip bunch on said bobbin, whereby said tip bunch is removed from said bobbin.

11. In a loom as set forth in claim 10 wherein said engaging means comprises:
(a) a bunch remover supporting member pivotally mounted adjacent said magazine and which supports said bunch remover;
(b) spring means normally urging said supporting member toward said common transfer position for placing said bunch remover into tip bunch engaging position;
(c) removable stop means located adjacent said magazine and adapted to prevent said bunch remover from entering said tip bunch engaging position;
(d) a first engaging means operatively connected to said stop and adapted to remove said stop when said first engaging means is moved;
(e) a second reciprocating engaging means located adjacent said first engaging means; and
(f) first connecting means operated by said bobbin releasing means and adapted to connect said first and second engaging means upon release of a bobbin to said common transfer position; whereby said first engaging means is moved by said second engaging means to remove said stop to allow said bunch remover to engage the tip bunch of said bobbin in said common transfer position.

12. In a loom as set forth in claim 11 wherein one of said engaging means has an opening and said connecting means comprises:

(a) a normally de-energized first solenoid means attached to the other of said engaging means and having a plunger which is aligned with said opening in said one engaging means, said plunger being adapted to connect said first and second engaging means upon energization of said first solenoid means; and
(b) a first switch means operatively connected to said bobbin selecting and releasing means and adapted to energize said first solenoid means upon release of a bobbin to said common transfer position.

13. In a loom as set forth in claim 10 wherein said disengaging means comprises:
(a) a primary disengaging means operatively connected to said bunch remover and adapted, when moved, to effect withdrawal of said bunch remover from engagement with a bobbin in said common transfer position;
(b) a secondary normally reciprocating disengaging means located adjacent said primary disengaging means; and
(c) second connecting means operated by said bobbin selecting and releasing means and adapted to connect said first and second disengaging means upon release of a bobbin to said common transfer position, whereby said first disengaging means is moved by said second disengaging means to move said bunch away from said tip bunch engaging position.

14. In a loom as set forth in claim 13 wherein one of said disengaging means has an opening and said connecting means comprises:
(a) a normally de-energized second solenoid means attached to the other of said disengaging means and having a plunger which is aligned with said opening in said one disengaging means, said plunger being adapted to connect said first and second disengaging means upon energization of said second solenoid means; and
(b) a second switch means operatively connected to said bobbin selecting and releasing means and adapted to energize said second solenoid means upon release of a bobbin to said common transfer position.

References Cited

UNITED STATES PATENTS

| | | | |
|---|---|---|---|
| 3,101,098 | 8/1963 | Payne | 139—232 |
| 2,399,457 | 4/1946 | Alix et al. | 139—232.3 |
| 2,634,765 | 4/1953 | Stuer | 139—232.3 |
| 2,929,411 | 3/1960 | Kimmel | 139—232 |
| 3,247,870 | 4/1966 | Picanol | 139—232 |

FOREIGN PATENTS

| | | |
|---|---|---|
| 769,673 | 6/1934 | France. |

HENRY S. JAUDON, *Primary Examiner.*